US012601028B2

(12) United States Patent　　(10) Patent No.:　　US 12,601,028 B2

Cobo et al.　　(45) Date of Patent:　　Apr. 14, 2026

(54) STEEL PART HAVING HIGH STRENGTH AND HIGH BENDABILITY

(71) Applicant: ArcelorMittal, Luxembourg (LU)

(72) Inventors: Sebastian Cobo, Montigny-les-Metz (FR); Matthieu Salib, Maizieres-les-Metz Cedex (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 19/321,529

(22) Filed: Sep. 8, 2025

(65) Prior Publication Data

US 2025/0382680 A1　　Dec. 18, 2025

Related U.S. Application Data

(63) Continuation of application No. PCT/IB2025/051726, filed on Feb. 18, 2025.

(30) Foreign Application Priority Data

Apr. 15, 2024　　(WO) ................. PCT/IB2024/053675

(51) Int. Cl.
　　*B32B 15/01*　　(2006.01)
　　*B21D 22/02*　　(2006.01)
　　　　(Continued)

(52) U.S. Cl.
　　CPC ............. *C21D 9/48* (2013.01); *B21D 22/022* (2013.01); *B32B 15/012* (2013.01); *C21D 1/18* (2013.01);
　　　　(Continued)

(58) Field of Classification Search
None
See application file for complete search history.

(56) References Cited

U.S. PATENT DOCUMENTS 11,111,558　B2 *　9/2021　Takashima ............. C21D 6/002
12,312,661　B2 *　5/2025　Cobo .................... C21D 6/005
　　　　(Continued)

FOREIGN PATENT DOCUMENTS

JP　　　2012237048　A　　12/2012
WO　WO2013099197　A1　　7/2013
　　　　(Continued)

OTHER PUBLICATIONS

H.-J. Bunge: Texture Analysis in Materials Science—Mathematical Methods. 1st English Edition by Butterworth Co (Publ.) 1982.

*Primary Examiner* — Daniel J. Schleis
(74) *Attorney, Agent, or Firm* — Davidson Kappel LLC

(57)　　　　ABSTRACT

Steel part having a chemical composition comprising, by weight %, 0.18≤C≤0.27, 0.18≤Si≤0.30, 1.0≤Mn≤1.5, 0.14≤Cr≤0.25, 0.02≤Al≤0.06, 0.02≤Ti≤0.06, 0.0020≤B≤0.0040, 0≤S≤0.008, 0≤N≤0.020, the remainder of the composition being iron and unavoidable impurities resulting from the elaboration process, having a microstructure including, in surface fraction, 95% or more of martensite and a prior austenite grain skin refinement ratio equal to or above 1.2, the ratio being defined as PAGS_B/PAGS_S, wherein PAGS_B is the average prior austenite grain diameter in the bulk (3) expressed in μm and PAGS_S is the average prior austenite grain diameter in the skin (2), also expressed in μm.

7 Claims, 1 Drawing Sheet

(51) Int. Cl.

| | |
|---|---|
| *C21D 1/18* | (2006.01) |
| *C21D 6/00* | (2006.01) |
| *C21D 8/04* | (2006.01) |
| *C21D 9/48* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/60* | (2006.01) |

(52) U.S. Cl.
CPC ............. *C21D 6/004* (2013.01); *C21D 6/005* (2013.01); *C21D 6/008* (2013.01); *C21D 8/04* (2013.01); *C21D 8/0426* (2013.01); *C21D 8/0436* (2013.01); *C21D 8/0463* (2013.01); *C21D 8/0478* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/60* (2013.01); *C21D 2211/008* (2013.01)

(56) References Cited

U.S. PATENT DOCUMENTS

| | | | | |
|---|---|---|---|---|
| 12,404,571 | B2 * | 9/2025 | Cobo | ...................... C22C 38/06 |
| 12,428,711 | B2 * | 9/2025 | Cobo | ................... C21C 7/0006 |
| 2020/0157648 | A1 | 5/2020 | Kong et al. | |

FOREIGN PATENT DOCUMENTS

| | | | |
|---|---|---|---|
| WO | WO2018117552 | A1 | 6/2018 |
| WO | WO2025109586 | A1 | 5/2025 |

* cited by examiner

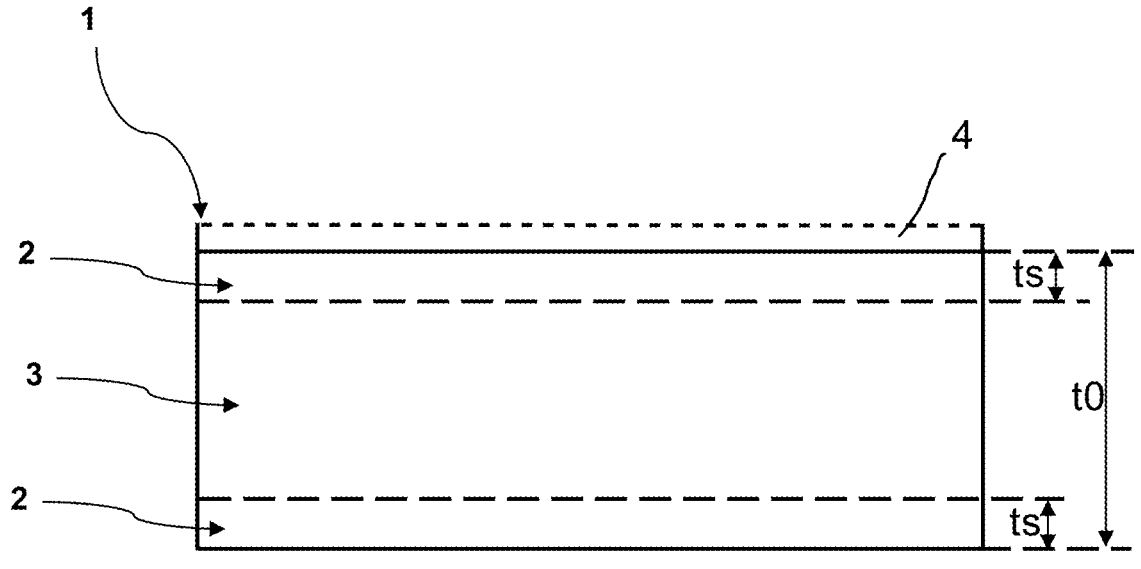

STEEL PART HAVING HIGH STRENGTH AND HIGH BENDABILITY

This is a continuation of International Patent Application PCT/IB2025/051726, filed on Feb. 18, 2025, which claims priority to International Patent Application PCT/IB2024/053675, filed on Apr. 15, 2024, all of the above are hereby incorporated by reference herein.

The present invention relates to a high strength steel part and a process to produce the same.

BACKGROUND

High strength steel parts can be used as structural elements in automotive vehicles for anti-intrusion or energy absorption functions.

In such type of applications, it is desirable to produce steel parts that combine high mechanical strength and high impact resistance. Moreover, one of the major challenges in the automotive industry is to decrease the weight of vehicles in order to improve their fuel efficiency without neglecting the safety requirements.

This weight reduction can be achieved in particular thanks to the use of steel parts with a predominantly martensitic microstructure.

SUMMARY OF THE INVENTION

It is challenging to produce very high strength steels which also have a good resistance to the formation of cracks under bending. Indeed, very high strength steels tend to crack early on when submitted to a bending load. This is detrimental to the crash worthiness of a part produced with such high strength steel, because even though the material is able to withstand very high loads thanks to its high tensile strength, once cracks start to appear in the part, these cracks will quickly propagate under the continued load and the part will fail prematurely.

It is an object of the present invention to address the above-mentioned challenge and to provide a steel part having a combination of high strength and high bendability.

The present invention provides a steel part having the following characteristics:

a chemical composition comprising, by weight %

$$0.18 \leq C \leq 0.27$$
$$0.18 \leq Si \leq 0.30$$
$$1.0 \leq Mn \leq 1.5$$
$$0.14 \leq Cr \leq 0.25$$
$$0.02 \leq Al \leq 0.06$$
$$0.02 \leq Ti \leq 0.06$$
$$0.0015 \leq B \leq 0.0040$$
$$0 \leq S \leq 0.008$$
$$0 \leq P \leq 0.04$$
$$0 \leq N \leq 0.020$$
$$0 \leq Mo \leq 0.3$$
$$0 \leq Nb \leq 0.1$$
$$0 \leq V \leq 0.3$$

-continued $$0 \leq Cu \leq 0.25$$
$$0 \leq Ni \leq 0.25$$
$$0 \leq Sn \leq 0.05$$
$$0 \leq As \leq 0.03$$
$$0 \leq Sb \leq 0.03$$

$0 \leq Pb \leq 0.03$ the remainder of the composition being iron and unavoidable impurities resulting from the elaboration process, a microstructure comprising, in surface fraction, 95% or more of martensite, the remainder being optional bainite, ferrite and/or retained austenite, said steel part comprising a bulk portion occupying the centermost 80% of its thickness and a skin occupying the outermost 10% of the thickness on either side of said bulk portion, a prior austenite grain skin refinement ratio equal to or above 1.2, said ratio being defined as PAGS_B/PAGS_S, wherein PAGS_B is the average prior austenite grain diameter in the bulk (3) expressed in μm and PAGS_S is the average prior austenite grain diameter in the skin (2), also expressed in μm.

The present invention also provides a process for producing a steel part comprising the following steps:

Providing a steel composition aa above,

Casting a semi-product having said composition at a casting speed equal to or greater than 3.0 m/min, Optionally cooling said semi-product after casting, Maintaining or reheating said semi-product in a temperature range of 1075° C. to 1200° C., Hot-rolling said semi-product using a finishing temperature equal to or above 850° C. and a coiling temperature equal to or above 525° C. to obtain a hot rolled steel sheet, Pickling said hot rolled steel sheet, Optionally cold-rolling said hot rolled steel sheet to obtain a cold rolled steel sheet, Applying an annealing step to said hot rolled or cold rolled steel sheet by heating it in an annealing furnace, to an annealing temperature TA, expressed in ° C., comprised from 700° C. to 850° C., said furnace further comprising a soaking section in which the steel sheet is maintained at said temperature TA for a holding time tA, comprised from 10 seconds to 20 minutes, optionally cooling said annealed steel sheet to a temperature range from 400° C. to 700° C., optionally coating said annealed steel sheet with a metallic coating, cutting said steel sheet to a predetermined shape, so as to obtain a steel blank, heating said steel blank to a temperature equal to or above Ac3 and equal to or lower than 950° C. during 10 seconds to 15 minutes to obtain a heated steel blank, transferring said heated steel blank to a forming press, hot-forming said heated blank in the forming press to obtain a formed part, die-quenching said formed part to obtain a steel part optionally paint baking said steel part at a temperature from 150° C. to 250° C. for a time comprised from 10 minutes to 2 hours.

BRIEF DESCRIPTION OF THE DRAWINGS

FIG. 1 shows a schematic cross section of a steel part according to the invention.

DETAILED DESCRIPTION

The invention will now be described in detail and illustrated by examples without introducing limitations, and referring to FIG. 1, which is a schematic cross section of a steel part according to the invention.

A blank of steel refers to a flat sheet of steel, which has been cut to any shape suitable for its use. A blank has a top and bottom face, which are also referred to as a top and bottom side or as a top and bottom surface. The distance between said faces is designated as the thickness of the blank. The thickness can be measured for example using a micrometer, the spindle and anvil of which are placed on the top and bottom faces. In a similar way, the thickness can also be measured on a formed part.

A steel part refers to a part that was formed from a steel blank.

By average thickness of a part, or of a portion of a part, it is meant the overall average thickness of the material making up the part after it has been formed into a 3-dimensional part from an initially flat sheet.

When referring to the thickness of a steel part, one refers to the local thickness measured using for example the above described spindle and angle or else using for example a micrograph of a cross section.

Referring to FIG. 1, a steel part 1 comprises a bulk portion 3 and a top and bottom skin layer 2. The total thickness of the steel part 1 is to and the thickness ts of the skin layers 2 is such that ts=t0*10%. In other words, the skin layers 2, or simply the skin, occupies the outermost 10% of the thickness on either side of the bulk. Conversely, the bulk portion 3, or simply the bulk, occupies the 80% centermost portion of the steel part thickness. An optional metallic coating 4 described below is shown solely schematically.

Hot stamping is a forming technology which involves heating a blank up to a temperature at which the microstructure of the steel has at least partially transformed to austenite, forming the blank at high temperature by stamping it and quenching the formed part to obtain a microstructure having a very high strength. Hot stamping allows to obtain very high strength parts with complex shapes and presents many technical advantages. It should be understood that the thermal treatment to which a part is submitted includes not only the above-described thermal cycle of the hot stamping process itself, but also possibly other subsequent heat treatment cycles such as for example the paint baking step, performed after the part has been painted in order to cure the paint. The mechanical properties of hot stamped parts below are those measured after the full thermal cycle, including optionally for example a paint baking step.

The yield strength and ultimate tensile strength are measured according to ISO standard ISO 6892-1, published in October 2009. The tensile test specimens are cut-out from flat areas of the hot stamped part. If necessary, small size tensile test samples are taken to accommodate for the total available flat area on the part.

The bending angle is measured according to the VDA-238 bending standard. For the same material, the bending angle depends on the thickness. For the sake of simplicity, the bending angle values of the current invention refer to a thickness of 1.5 mm. If the thickness is different than 1.5 mm, the bending angle value needs to be normalized to 1.5 mm by the following calculation where $\alpha1.5$ is the bending angle normalized at 1.5 mm, t is the thickness, and at is the bending angle for thickness t:

$$\alpha1.5 = (\alpha t \times \sqrt{t})/\sqrt{1.5}$$

In the current invention, the bending angle was measured in the transverse direction, i.e. the transverse direction to the rolling direction along which the steel sheet travelled during the hot-rolling step. The bending angle was measured using a laser measurement device. The reported values are those reached when the maximum bending force, Fmax expressed in N, is reached. When performing bending tests on hot stamped part, the samples are cut-out from flat areas of the part. If necessary, small size samples are taken to accommodate for the total available flat area on the part. If the rolling direction on the hot stamped part is not known, it can be determined for example using the following protocol:

Electron Back-Scattered Diffraction (EBSD) analysis is performed across a section of the sample in a Scanning Electron Microscope (SEM).

The rolling direction is determined according to the intensity of the Orientation Density Function (ODF) representative of the major fibers at $\varphi2=45°$, where $\varphi2$ is the Euler angle as defined in "H.-J. Bunge: Texture Analysis in Materials Science-Mathematical Methods. 1st English Edition by Butterworth Co (Publ.) 1982" (see FIGS. 2.2 and 2.3 of said publication for the definition of $\varphi2$).

The bending angle of a part is representative of the ability of the part to resist deformation without cracking.

An example of experimental protocol to determine the average prior austenite grain diameter (PAGS) will now be described. This protocol is given by way of illustration and is in no way limitative:

A specimen is cut from the press hardened steel part and polished using a solution containing fine oxides in suspension to produce an absolutely scratch-free and deformation-free surface known as a mirror-polished surface.

EBSD maps (Electron Back-Scattered Diffraction) are then acquired, using for example a JEOL IT800 Field-Emission-Gun Secondary-Electron-Microscope (FEG-SEM) equipped with a Symmetry2-Oxford CMOS EBSD camera. Each EBSD map represents a zone of 0.25 mm*0.20 mm. Two EBSD maps are carried out for each measurement to be both statistic of the area considered and representative of the microstructure.

Prior Austenite Grains can be reconstructed thanks to crystallographic calculation based on both crystallographic orientation of the measured martensitic grains (measured EBSD maps) and orientation relationship linking martensite and austenite.

The calculation is carried out for example using the Merengue2® software. The calculated austenite map is then post-treated using for example the AZtecCrystal software (Oxford Instruments®). Grain boundaries are defined as a minimum misorientation of 8°. Average Prior Austenite Grain Size (PAGS) is calculated based on the Equivalent Diameter (deq) of each grain of the considered map as follows:

$$PAGS = \frac{\pi}{4} * \frac{\sum d_{eq}^2}{\sum d_{eq}}$$

5 6

The composition of the steel part according to the invention will now be described.

The chemical compositions are given in terms of a lower and upper limit of the composition range, said limits being comprised within the possible composition range according to the invention. In the case when preferred ranges for a given element are disclosed, the present invention also discloses all possible combinations of these preferred ranges for each individual element.

According to the invention the carbon ranges from 0.18% to 0.27% to ensure a satisfactory strength. Above 0.27% of carbon, weldability and bendability of the steel sheet may be reduced. If the carbon content is lower than 0.18%, the tensile strength will not reach the targeted value.

The silicon content ranges from 0.18% to 0.30%. Silicon is an element participating in the hardening in solid solution and limiting carbides formation. Above 0.30%, silicon oxides form at the surface, which impairs the coatability of the steel. Below 0.18% the targeted mechanical properties are not met.

The manganese content ranges from 1.0% to 1.5%. Above 1.5%, the risk of MnS formation is increased to the detriment of the bendability. Below 1.0% the hardenability of the steel sheet during the hot stamping process is reduced and the targeted mechanical properties are not reached.

The chromium content ranges from 0.14% to 0.25%. Chromium is used to provide strength by solid solution hardening and to improve the hardenability of the steel sheet during hot stamping. Chromium is limited to 0.25% to limit costs and avoid processing issues. Below 0.14% the targeted mechanical properties are not met.

The aluminum content ranges from 0.02% to 0.06% as it is a very effective element for deoxidizing the steel in the liquid phase during elaboration. Aluminum can protect boron if titanium content is not sufficient. The aluminum content is lower than 0.06% to avoid oxidation problems and ferrite formation during press hardening. Below 0.02% the desired deoxidizing properties of aluminum in the liquid phase are not reached.

The titanium content ranges from 0.02% to 0.06% in order to protect boron, which would otherwise be trapped within BN precipitates. Titanium content is limited to 0.06% to avoid excess TIN formation. Below 0.02%, the desired boron protection properties of titanium are not reached.

The boron content ranges from 0.0015% to 0.0040%. Boron improves the hardenability of the steel. The boron content is not higher than 0.0040% to avoid semi-product breaking issues right after casting. Below 0.0015%, the targeted mechanical properties are not met.

Sulphur is controlled to below or equal to 0.005%, preferably 0.003%, because the presence of Sulphur in the liquid steel can lead to the formation of MnS precipitates which are detrimental to bendability.

Phosphorous is controlled to below or equal to 0.04%, because it leads to fragility and weldability issues. In a specific embodiment, the P content is controlled to below or equal to 0.02% to further avoid fragility and weldability issues.

Nitrogen is controlled to below or equal to 0.020% preferentially below or equal to 0.015%. The presence of Nitrogen can lead to the formation of precipitates such as TiN or TiNbCN, which can be detrimental to the bendability.

Molybdenum is optionally added up to 0.3%. Molybdenum improves the hardenability of the steel. Molybdenum is limited to 0.3% to limit costs and avoid processing issues.

Niobium is optionally added up to 0.1%. Niobium improves ductility of the steel. Niobium is limited to 0.1% to limit costs and avoid processing issues.

Vanadium is optionally added up to 0.3%. Vanadium improves the hardenability of the steel. Vanadium is limited to 0.3% to limit costs and avoid processing issues.

In case one or several of the above elements are added, the following formula is further verified: $Cr+Mo+Nb+V \leq 0.5\%$ in order to limit costs and avoid processing issues.

The remainder of the composition of the steel is iron and impurities resulting from the elaboration process. The level of impurities resulting from the elaboration process will depend on the production route used and the level of scrap used in the steel melt. For example, when using a Basic oxygen furnace route with a low level of steel scrap (recycled steel), the level of impurities will remain very low. It is however also possible to add a high amount of scrap in the converter to the pig iron produced in the basic oxygen furnace, which will increase the level of impurities. Furthermore, when elaborating the steel using an electric furnace for example, with a very high ratio of recycled scrap steel, the level of impurities will be significantly increased. When using a high level of scrap, the level of Cu can reach 0.25%, Ni can reach 0.25%, Sn can reach 0.05%, As can reach 0.03%, Sb can reach 0.03% and Pb can reach 0.03%.

A steel part according to the invention can be produced by any suitable method.

A preferred method consists in first providing a semi-product through casting of a steel with a chemical composition according to the invention. The casting is done continuously or in batches. The semi-product has a thickness ranging for example from 40 mm to 120 mm, preferably from 50 mm to 70 mm. A casting speed equal to or greater than 3.0 m/min is maintained during the casting process and preferably equal to or greater than 4 m/min.

For example, a semi-product having the above-described chemical composition is manufactured by continuous casting wherein the semi-product optionally undergoes a direct soft reduction process during the continuous casting process to avoid central segregation.

The semi-product provided by casting can be used directly at a high temperature after the casting step or may be first cooled down to a lower temperature and then reheated for hot rolling.

Before the subsequent hot rolling step, the semi-product is maintained or reheated to a reheating temperature from 1075° C. to 1200° C., preferably from 1100° C. to 1200° C. Controlling the temperature of the semi-product in this range before hot rolling allows to control the mechanical power necessary to diminish the semi-product thickness throughout the entire hot-rolling process.

The manufacturing process further comprises the following steps:

Pickling said hot rolled steel sheet,

Optionally cold-rolling said hot rolled steel sheet to obtain a cold rolled steel sheet, Applying an annealing step to said hot rolled or cold rolled steel sheet by heating it in an annealing furnace, to an annealing temperature TA, expressed in ° C., ranging from 700° C. to 850° C., said furnace further comprising a soaking section in which the steel sheet is maintained at said temperature TA for a holding time tA, comprised from 10 seconds to 20 minutes, Optionally cooling said annealed steel sheet to a temperature range from 400° C. to 700° C., Optionally coating said annealed steel sheet with a metallic coating, Cutting said steel sheet to a predetermined shape, so as to obtain a steel blank, Heating said steel blank to a temperature equal to or above Ac3 and equal to or lower than 950° C. during 10 seconds to 15 minutes to obtain a heated steel blank, Transferring said heated steel blank to a forming press, Hot-forming said heated blank in the forming press to obtain a formed part, Die-quenching said formed part to obtain a steel part, Optionally paint baking said steel part at a temperature from 150° C. to 250° C. for a time comprised from 10 minutes to 2 hours.

Optionally the steel part can be obtained by hot stamping a steel blank that comprises a metallic coating on at least one of its outer surfaces. For example, said coating is an aluminum-based coating comprising at least 50% of aluminum. When hot stamping said steel blank, the heat from the austenitizing step triggers interdiffusion between the elements of the steel substrate, below the coating, and the elements of the coating. As a consequence, the coating on the steel part will have in particular an increased iron content compared to the amount of iron present in the metallic coating on the steel blank.

The microstructure of the steel part according to the invention will now be described:

The steel part comprises in surface fraction, 95% or more of martensite, the remainder being optional bainite, ferrite and/or retained austenite. Bainite, ferrite and retained austenite are optional phases and in a preferred embodiment, the microstructure of the part is 100% made of martensite.

Surprisingly, the inventors have found that the steel parts according to the invention exhibit a difference of PAGS between the skin and the bulk. More specifically, the inventors have found that the steel parts according to the invention have finer PAGS in the skin than in the bulk. PAGS_B is the average prior austenite grain diameter in the bulk, expressed in μm. PAGS_S is the average prior austenite grain diameter in the skin, also expressed in μm. A PAGS skin refinement ratio is defined as PAGS_B/PAGS_S. The steel part according to the invention has a PAGS skin refinement ratio equal to or above 1.2.

In a particular embodiment, the skin average prior austenite grain diameter PAGS_S is equal to or lower than 6.0 μm.

The inventors have found that a steel part having the characteristics described previously shows excellent strength and bendability. This in turn provides for a part having very good crash resistance and crash absorption capacity.

In particular, the inventors have found that said steel parts have an ultimate tensile strength measured in the transverse direction equal to or higher than 1350 MPa, preferably higher than 1400 MPa, and a bending angle α1.5 normalized to 1.5 mm thickness and measured in the transverse direction equal to or higher than 57°.

The invention will now be illustrated by way of examples.

Samples R1 to R3 are reference samples, not according to the invention. Samples I1 to I4 are inventive samples, according to the invention.

Tables 1a and 1b summarize the chemical compositions of the samples (in wt %) as well as the computed Ac3 temperature (in ° C.).

TABLE 1a

| Sample reference | chemical composition | | | | | | | | | |
| --- | --- | --- | --- | --- | --- | --- | --- | --- | --- | --- |
| | C | S | N | Si | Mn | P | Cr | Mo | Ni | Al |
| R1 | 0.24 | 0.003 | 0.007 | 0.22 | 1.2 | 0.012 | 0.17 | 0.004 | 0.02 | 0.04 |
| R2 | 0.24 | 0.002 | 0.008 | 0.24 | 1.1 | 0.012 | 0.17 | 0.003 | 0.02 | 0.03 |
| R3 | 0.24 | 0.002 | 0.008 | 0.27 | 1.3 | 0.011 | 0.19 | 0.004 | 0.03 | 0.04 |
| I1 | 0.21 | 0.001 | 0.012 | 0.22 | 1.2 | 0.008 | 0.16 | 0.009 | 0.04 | 0.03 |
| I2 | 0.20 | 0.001 | 0.012 | 0.25 | 1.2 | 0.007 | 0.18 | 0.011 | 0.04 | 0.03 |
| I3 | 0.20 | 0.001 | 0.012 | 0.25 | 1.2 | 0.007 | 0.18 | 0.011 | 0.04 | 0.03 |
| I4 | 0.21 | 0.001 | 0.010 | 0.23 | 1.2 | 0.010 | 0.18 | 0.007 | 0.03 | 0.03 |

TABLE 1b

| Sample reference | chemical composition | | | | | | | | | Ac3 (° C.) |
| --- | --- | --- | --- | --- | --- | --- | --- | --- | --- | --- |
| | Cu | Nb | Ti | V | Sn | As | Ca | Sb | B | |
| R1 | 0.01 | 0.002 | 0.03 | 0.002 | <0.002 | <0.002 | 0.003 | <0.002 | 0.0028 | 849 |
| R2 | 0.02 | <0.002 | 0.03 | 0.002 | <0.002 | <0.002 | 0.002 | <0.002 | 0.0029 | 850 |
| R3 | 0.03 | 0.002 | 0.04 | 0.003 | 0.002 | 0.003 | 0.002 | 0.002 | 0.0029 | 848 |
| I1 | 0.07 | 0.002 | 0.04 | 0.002 | 0.025 | 0.003 | 0.002 | 0.002 | 0.0029 | 856 |
| I2 | 0.07 | 0.002 | 0.04 | 0.008 | 0.027 | 0.004 | 0.001 | <0.002 | 0.0026 | 857 |
| I3 | 0.07 | 0.003 | 0.04 | 0.008 | 0.027 | 0.004 | 0.001 | <0.002 | 0.0026 | 857 |
| I4 | 0.04 | <0.002 | 0.03 | 0.002 | 0.021 | 0.003 | 0.002 | <0.002 | 0.0026 | 854 |

Table 2 summarizes the process parameters that were used to produce the samples. The underlined values in the table are not according to the invention.

TABLE 2

| | | | | | | | Paint | |
| | | | | | | | baking | Paint |
| | | Reheating | Soaking | | Austeniti- | | temper- | baking |
| | Casting | Temper- | temper- | Soaking | zation | Austeniti- | ature | time |
| sample | Speed | ature | ature | time | temperature | zation | (° C.) | (min) |
| reference | (m/min) | (° C.) | (° C.) | (seconds) | (° C.) | time (s) | | |
|---|---|---|---|---|---|---|---|---|
| R1 | 1.2 | 1275 | 752 | 55 | 900 | 390 | 170 | 20 |
| R2 | 1.0 | 1260 | 746 | 48 | 900 | 360 | 170 | 20 |
| R3 | 1.1 | 1270 | 744 | 57 | 900 | 390 | 170 | 20 |
| I1 | 3.9 | 1175 | 753 | 64 | 900 | 390 | 170 | 20 |
| I2 | 3.8 | 1168 | 756 | 69 | 900 | 390 | 170 | 20 |
| I3 | 3.6 | 1172 | 746 | 76 | 900 | 450 | 170 | 20 |
| I4 | 3.9 | 1173 | 803 | 75 | 900 | 390 | 170 | 20 |

Table 3 summarizes the properties that were measured on the samples after hot stamping and paint baking.

TABLE 3 properties of the samples after hot stamping

| | | | Ultimate | Bending at |
| | | Yield | Tensile | Fmax eq to |
| | | Strength in | Strength in | 1.5mm in |
| | Average | Transverse | Transverse | Transverse |
| Sample | Thickness | Direction | Direction | Direction (°) |
| reference | (mm) | (MPa) | (MPa) | |
|---|---|---|---|---|
| R1 | 1.5 | 1201 | 1520 | 54 |
| R2 | 1.4 | 1189 | 1507 | 55 |
| R3 | 1.5 | 1194 | 1526 | 52 |
| I1 | 1.4 | 1150 | 1445 | 62 |
| I2 | 1.5 | 1151 | 1434 | 62 |
| I3 | 2.0 | 1163 | 1461 | 57 |
| I4 | 1.5 | 1162 | 1470 | 63 |

Table 4 summarizes the microstructure characteristics of the samples after hot stamping. The average prior austenite grain diameters (PAGS_S and PAGS_B) are expressed in microns. The Prior austenite grain surface refinement ratio is calculated by dividing two values having the same unit and is therefore a dimensionless quantity. The underlined values in the table are not according to the invention.

TABLE 4 microstructure of the samples after hot stamping

| | | Average prior austenite grain diameter in the skin = | Average prior austenite grain diameter in the bulk = | Prior austenite grain skin refinement ratio = |
| sample reference | Martensite content | PAGS_S (μm) | PAGS_B (μm) | PAGS_B/PAGS_S |
|---|---|---|---|---|
| R1 | 100% | 8.7 | 7.6 | 0.9 |
| R2 | 100% | 7.8 | 8.8 | 1.1 |
| R3 | 100% | 9.5 | 9.2 | 1.0 |
| I1 | 100% | 4.8 | 6.0 | 1.3 |
| I2 | 100% | 5.1 | 7.2 | 1.4 |
| I3 | 100% | 5.6 | 6.8 | 1.2 |
| I4 | 100% | 4.5 | 8.0 | 1.8 |

The steel parts according to the invention have a Prior austenite skin grain refinement ratio equal to or above 1.2 and a chemistry according to the invention, which allows then to reach very high mechanical properties with an ultimate tensile strength equal to or above 1350 MPa in the transverse direction, while retaining a high bending angle normalized to 1.5 mm thickness equal to or above 57° in the transverse direction.

What is claimed is:

1. A steel part having a chemical composition comprising, by weight %:

$$0.18 \leq C \leq 0.27$$

$$0.18 \leq Si \leq 0.30$$

$$1.0 \leq Mn \leq 1.5$$

$$0.14 \leq Cr \leq 0.25$$

$$0.02 \leq Al \leq 0.06$$

$$0.02 \leq Ti \leq 0.06$$

$$0.0015 \leq B \leq 0.0040$$

$$0 \leq S \leq 0.008$$

$$0 \leq P \leq 0.04$$

$$0 \leq N \leq 0.020$$

$$0 \leq Mo \leq 0.3$$

$$0 \leq Nb \leq 0.1$$

$$0 \leq V \leq 0.3$$

$$0 \leq Cu \leq 0.25$$

$$0 \leq Ni \leq 0.25$$

$$0 \leq Sn \leq 0.05$$

$$0 \leq As \leq 0.03$$

$$0 \leq Sb \leq 0.03$$

$$0 \leq Pb \leq 0.03$$

a remainder of the composition being iron and unavoidable impurities resulting from processing; and a microstructure comprising, in surface fraction, 95% or more of martensite, 0-5% bainite, 0-5% ferrite and 0-5% retained austenite, the steel part comprising a bulk portion occupying a centermost 80% of its thickness and a skin occupying an outermost 10% of the thickness on either side of the bulk portion, a prior austenite grain skin refinement ratio equal to or above 1.2, the prior austenite grain skin refinement ratio being defined as PAGS_B/PAGS_S, wherein PAGS_B is the average prior austenite grain diameter in the bulk portion expressed in μm and PAGS_S is the average prior austenite grain diameter in the skin, also expressed in μm.

2. The steel part according to claim 1 wherein the average prior austenite grain diameter in the skin PAGS_S is equal to or lower than 6.0 μm.

3. The steel part according to claim 1 wherein the steel part was obtained by hot stamping a steel blank.

4. The steel part according to claim 1 wherein the steel part has an ultimate tensile strength measured in the transverse direction equal to or higher than 1350 MPa.

5. The steel part according to claim 1 wherein the steel part has a bending angle α1.5 normalized to 1.5 mm thickness and measured in the transverse direction equal to or higher than 57°.

6. The steel part according to claim 1 wherein the steel part is topped with a metallic coating comprising an aluminum content, expressed in weight %, equal to or higher than 50%.

7. A process for producing a steel part comprising the following steps:

casting a semi-product at a casting speed equal to or greater than 3.0 m/min, the semi-product having a composition comprising, by weight %:

$0.18 \leq C \leq 0.27$
$0.18 \leq Si \leq 0.30$
$1.0 \leq Mn \leq 1.5$
$0.14 \leq Cr \leq 0.25$
$0.02 \leq Al \leq 0.06$
$0.02 \leq Ti \leq 0.06$
$0.0015 \leq B \leq 0.0040$
$0 \leq S \leq 0.008$
$0 \leq P \leq 0.04$
$0 \leq N \leq 0.020$
$0 \leq Mo \leq 0.3$
$0 \leq Nb \leq 0.1$
$0 \leq V \leq 0.3$ $0 \leq Cu \leq 0.25$
$0 \leq Ni \leq 0.25$
$0 \leq Sn \leq 0.05$
$0 \leq As \leq 0.03$
$0 \leq Sb \leq 0.03$
$0 \leq Pb \leq 0.03$ a remainder of the composition being iron and unavoidable impurities resulting from processing;

optionally cooling the semi-product after casting, maintaining or reheating the semi-product in a temperature range of 1075° C. to 1200° C.;

hot-rolling the semi-product using a finishing temperature equal to or above 850° C. and a coiling temperature equal to or above 525° C. to obtain a hot rolled steel sheet;

pickling the hot rolled steel sheet;

optionally cold-rolling the hot rolled steel sheet to obtain a cold rolled steel sheet;

applying an annealing step to the hot rolled or cold rolled steel sheet by heating in an annealing furnace, to an annealing temperature TA, expressed in ° C., comprised from 700° C. to 850° C., the furnace further comprising a soaking section where the steel sheet is maintained at the temperature TA for a holding time tA, comprised from 10 seconds to 20 minutes;

optionally cooling the annealed steel sheet to a temperature range from 400° C. to 700° C.;

optionally coating the annealed steel sheet with a metallic coating;

cutting the steel sheet to a predetermined shape, so as to obtain a steel blank;

heating the steel blank to a temperature equal to or above Ac3 and equal to or lower than 950° C. during 10 seconds to 15 minutes to obtain a heated steel blank;

transferring the heated steel blank to a forming press;

hot-forming the heated blank in the forming press to obtain a formed part;

die-quenching the formed part to obtain a steel part; and optionally paint baking said steel part at a temperature from 150° C. to 250° C. for a time comprised from 10 minutes to 2 hours.

* * * * *